United States Patent
Azevedo Júnior et al.

(10) Patent No.: US 9,835,118 B2
(45) Date of Patent: Dec. 5, 2017

(54) HEAT EXCHANGER FOR THE FEEDING OF FUEL IN INTERNAL COMBUSTION ENGINES

(71) Applicant: MAHLE METAL LEVE S.A., Jundiaí-SP (BR)

(72) Inventors: Edson Valdomiro de Azevedo Júnior, São Paulo (BR); Tadeu Miguel Malagó Amaral, São Paulo (BR)

(73) Assignee: MAHLE METAL LEVE S.A., Jundiai-SP (BR)

( * ) Notice: Subject to any disclaimer, the term of this patent is extended or adjusted under 35 U.S.C. 154(b) by 191 days.

(21) Appl. No.: 14/901,310

(22) PCT Filed: Jul. 1, 2014

(86) PCT No.: PCT/BR2014/000217
§ 371 (c)(1),
(2) Date: Dec. 28, 2015

(87) PCT Pub. No.: WO2015/000048
PCT Pub. Date: Jan. 8, 2015

(65) Prior Publication Data
US 2016/0265490 A1    Sep. 15, 2016

(30) Foreign Application Priority Data
Jul. 2, 2013   (BR) .............................. 102013017090

(51) Int. Cl.
*F02G 5/00* (2006.01)
*F01P 9/00* (2006.01)
(Continued)

(52) U.S. Cl.
CPC ............ *F02M 31/10* (2013.01); *F01M 5/002* (2013.01); *F02M 31/102* (2013.01); *F28D 9/005* (2013.01);
(Continued)

(58) Field of Classification Search
CPC .... F02M 31/10; F02M 31/0102; F02M 31/14; F01M 5/002; F01P 11/08
(Continued)

(56) References Cited

U.S. PATENT DOCUMENTS 5,896,834 A * 4/1999 Gruner .................... F28D 9/005
123/196 AB
7,753,105 B2 * 7/2010 Acre .................... B60H 1/3227
165/140
(Continued)

FOREIGN PATENT DOCUMENTS

BR    102013004382-6 A2    11/2014
BR    102013017090-9 A2    6/2015
(Continued)

OTHER PUBLICATIONS

PCT International Search Report and Written Opinion dated Sep. 12, 2014, issued in corresponding PCT Application No. PCT/BR2014/000217.

*Primary Examiner* — Syed O Hasan
(74) *Attorney, Agent, or Firm* — Alston & Bird LLP

(57) ABSTRACT

The heat exchanger comprises a first and a second stage (E1,E2), each having an inlet and an outlet of water, the second stage (E2) having an inlet and an outlet of oil, the first stage (E1) being provided with fuel inlet and outlet nozzles, selectively connected, in parallel, to the fuel supply to the engine (M). The inlet and outlet of water of the first stage (E1) are respectively connected to the outlet of the water radiator, by means of a cooling water circuit internal to the engine (M), and to the water inlet of the second stage (E2). The water outlet of the second stage (E2) is connected to the inlet of a water radiator, and the inlet and outlet of oil in the second stage (E2) are connected in series to a lubricant oil circuit internal to the engine (M).

20 Claims, 5 Drawing Sheets

(51) Int. Cl.
*F02M 31/10* (2006.01)
*F01M 5/00* (2006.01)
*F28D 9/00* (2006.01)
*F02M 31/14* (2006.01)
*F28D 21/00* (2006.01)
*F28F 9/00* (2006.01)
*F01P 11/08* (2006.01)

(52) U.S. Cl.
CPC ......... *F28D 9/0037* (2013.01); *F28D 9/0093* (2013.01); *F01P 11/08* (2013.01); *F02M 31/14* (2013.01); *F28D 2021/0087* (2013.01); *F28D 2021/0089* (2013.01); *F28F 2009/004* (2013.01); *Y02T 10/126* (2013.01)

(58) Field of Classification Search
USPC .............................................. 123/553, 41.01
See application file for complete search history.

(56) References Cited

U.S. PATENT DOCUMENTS

| | | | |
|---|---|---|---|
| 8,752,522 B1 * | 6/2014 | Cohen | F01P 3/18 123/195 A |
| 2005/0053815 A1 | 3/2005 | Yang et al. | |
| 2016/0017822 A1 | 1/2016 | Amaral et al. | |

FOREIGN PATENT DOCUMENTS

| | | |
|---|---|---|
| CN | 105705763 A | 6/2016 |
| DE | 19654362 A1 | 6/1998 |
| EP | 3017179 A1 | 5/2016 |
| FR | 2870589 A1 | 11/2005 |
| JP | H11-337226 A | 12/1999 |
| WO | WO 2015/000048 A1 | 1/2015 |

\* cited by examiner

HEAT EXCHANGER FOR THE FEEDING OF FUEL IN INTERNAL COMBUSTION ENGINES

CROSS-REFERENCE TO RELATED APPLICATIONS

This application is the National Stage of International Application No. PCT/BR2014/000217, filed Jul. 1, 2014 published as WO/2015/000048 on Jan. 8, 2015. The International Application claims priority to Brazilian Application Serial No. BR1020130170909, filed Jul. 2, 2013. All of the above applications are incorporated herein by reference in their entireties.

FIELD OF THE INVENTION

The present invention refers to a heat exchanger, for example, of the plate type, developed to allow a sequential triple thermal interaction between the fuel to be injected in an internal combustion engine in normal operation, and the two cooling fluids defined by the lubricant oil and water, for allowing the fuel to be selectively and suitably heated under control of a thermal management system for feeding the engine with different fuels, each presenting a respective and particular flash point or vaporization point.

BACKGROUND OF THE INVENTION

As described in patent application BR 10 2013 004382-6, of the same assignee, improvements in energy efficiency, handling and reduction in the emission of pollutants may be achieved by means of a thermal management system for the feeding of fuel in an internal combustion engine, which is able to maintain the fuel at a temperature more adequate to the combustion upon its feeding to the engine. The thermal management system includes a heat exchanger which uses, as a heat source, the thermal energy dissipated by the engine itself, without the need for generating extra energy.

One of the means for dissipating the thermal energy is the vehicle radiator, which comprises a heat exchanger to cool the engine, preventing the latter from overheating by exchanging heat from the engine and its components to the environment, by means of the vehicle radiator and using water as the heat exchanging fluid. However, the heat transferred from the engine to the radiator water represents an energy which is lost and even undesired, since if this heat remains stored in the water, it loses efficiency as a thermal exchanging fluid. The cooler the radiator water, the more heat it will be able to absorb from the engine in a smaller amount of time.

Another known means for dissipating thermal energy from the engine is the lubricant oil itself which, besides lubricating moving parts of the engine, allows the heat generated by the latter to be carried outside from the engine and dissipated into the environment. Some engine parts, such as the crankshaft, bearings, camshaft, rods and pistons, may have their cooling entirely done by the lubricant oil of the engine. When overheated, the oil loses viscosity and may deteriorate, and consequently loses the desired lubricant properties and the capacity of cooling internal parts of the engine, impairing the correct operation of engine components, leading to major damages to the engine or even to the total loss of the vehicle engine.

Some vehicles, particularly heavy vehicles, are provided with an oil radiator, which takes the form of a heat exchanger, usually of the plate type, provided between the engine block and the required oil filter, usually downstream the latter, or even incorporated in a single block with the oil filter, as usually is the case in heavy vehicles, in order to function as a heat exchange enhancer between the lubricant oil and the radiator water. However, the oil radiators presently in use do not exchange heat between the oil and the fuel. Thus, as mentioned in said prior patent BR 10 2013 004382-6, in low temperature environments in which the fuel has the temperature thereof reduced to values at a distant low from the flash point temperature ("cold fuel"), there is a greater or lesser difficulty in burning the fuel fed to the engine, said difficulty being greater when using fuels having a high flash point.

It should be further observed that the typical pressure inside a fuel distributor in 1.0 L vehicles of indirect injection is around 4.2 bar. In such condition, the vaporization temperature of the fuel is greater than the vaporization temperature under atmospheric pressure. For vehicles provided with direct fuel injection, such values (pressure and vaporization temperature) are even higher.

It is also known that the increase in fuel temperature makes easier to obtain a spray of micrometric droplets, which will burn more easily when in contact with the spark from the ignition coil or when compressed to a certain pressure (diesel).

Although the thermal exchange between the heat dissipated by the operating engine and the fuel is sufficient for, in principle, suitably heating a somewhat "cold" fuel, this is not a working condition that presents an optimized thermoenergetic condition, allowing for engine failures, jolts, slow acceleration response and even high emission of pollutants due to poor fuel burning.

In "flex vehicles" (fueled by ethanol and/or gasoline in any mixture proportion) it is known that the engine yield is not optimized. An effective fuel heating system may provide optimized conditions by taking the fuel (for example, ethanol or gasoline) to better burning conditions (by heating the fuel to temperatures closer to its vaporization point) and to a consequent better yield of the engine.

Due to the facts mentioned above, in the prior patent application BR 10 2013 004382-6 it was proposed a managed system for fuel heating, in order to be maintained operating during the entire engine running time, in order to achieve high performance (energetic optimization) of the engine, better vehicle handling with fast response upon acting on the acceleration pedal, with optimized torque and power and lower pollutant emissions, not only in "flex" type vehicles (two or three fuels), but also in vehicles provided with an internal combustion engine operating with a single fuel, either liquid or gas.

One of the solutions proposed in said prior patent application, specifically the one illustrated in FIG. 3, comprises a management system for the feeding of fuel which is able to absorb, by means of a common heat, the desired thermal energy both from the cooling water flow and from the engine lubricating oil. However, said prior patent application does not limit the invention to one type of heat exchanger which may be applied to the thermal management system, in order to use, when necessary, the heat dissipated by the flows of cooling water and lubricant oil which are heated inside the engine and carried to the respective water and oil radiators.

SUMMARY OF THE INVENTION

The present invention has as an objective to provide a heat exchanger, for example of the plate type, to be used together with a thermal management system for the feeding of fuel in an internal combustion engine under normal operation, in order to provide a triple and sequential thermal interaction, between the fuel and both cooling fluids, defined by the water and lubricant oil, in order to selectively and adequately heat the fuel to temperatures closer to the vaporization point thereof, while obtaining a desired refrigeration of both cooling water and lubricant oil.

The present heat exchanger is applied to internal combustion engines provided with a cooling water circuit, having an inlet connected to an outlet of a water radiator, and an outlet; and with a lubricant oil circuit having an inlet and an outlet.

According to the invention, the heat exchanger comprises: a first and a second stage, each having an inlet and an outlet of water, the second stage having an inlet and outlet of oil and the first stage being provided with fuel inlet and outlet nozzles, selectively connected, in parallel, to the fuel supply to the engine; the inlet and the outlet of water of the first stage being respectively connected to the water radiator outlet by means of the cooling water circuit and to the water inlet of the second stage; the water outlet of the second stage being connected to the inlet of the water radiator, and the inlet and outlet of oil, in the second stage, being connected in series to the lubricant oil circuit.

The invention therefore provides a triple heat exchanger, to be operatively associated with an automatic thermal management system for the feeding of fuel to an internal combustion engine under operation, allowing for a selective and sequential thermal exchange between the three fluids defined by the lubricant oil circulating inside the engine, by the cooling water circulating through a water radiator and inside the engine, and also by the fuel to be injected in the engine at a temperature suitable for the complete burning thereof inside the combustion chamber. With the thermal exchange between the fuel and the water in the first stage, followed by a second thermal exchange between the water circulated by the engine and the lubricant oil in the second stage, it is possible, by means of a simple, efficient and easily installed construction, to obtain the advantages of simultaneously cooling the lubricant oil and the radiator water, with double energetic use for heating the fuel to be supplied to the engine. The construction of the heat exchanger in two stages allow the latter to be mounted in a compact manner or even separately, for better adapting to the constructive features of the engine to which said heat exchanger will be applied. The proposed heat exchanger, when used together with an automatic thermal management system, allows that the heating of the fuel, either single or in a mixture, to be carried to the injection system of the engine in a better temperature condition for the combustion thereof, thereby reducing fuel consumption and damages to the environment, and improving the efficiency of the engine and also of the vehicle to which said engine is associated, the thermal energy used for the selective heating of the fuel being obtained from the very thermal energy dissipated by the internal combustion engine.

BRIEF DESCRIPTION OF THE DRAWINGS

The invention will be described below, with reference to the enclosed drawings, given by way of example of possible configurations of the proposed heat exchanger, in which.

DESCRIPTION OF THE INVENTION

As mentioned above and illustrated in the attached drawings, the heat exchanger HE of the invention is applied to an internal combustion engine M, using a single fuel or a varying mixture of fuels presenting different vaporization temperatures, as is the case of "flex" engines which use, for example, gasoline, ethanol or a mixture thereof in different proportions. The heat exchanger HE of the invention was developed to operate together with a thermal management system TMS for the feeding of fuel during the entire vehicle operation, in order to maintain the fuel being supplied to the engine M at an optimized temperature for efficient combustion, lower than that of the vaporization point. The thermal management system TMS may be defined, for example, as described in prior patent application BR10 2013 004382-6, of the same applicant.

Figure 1:
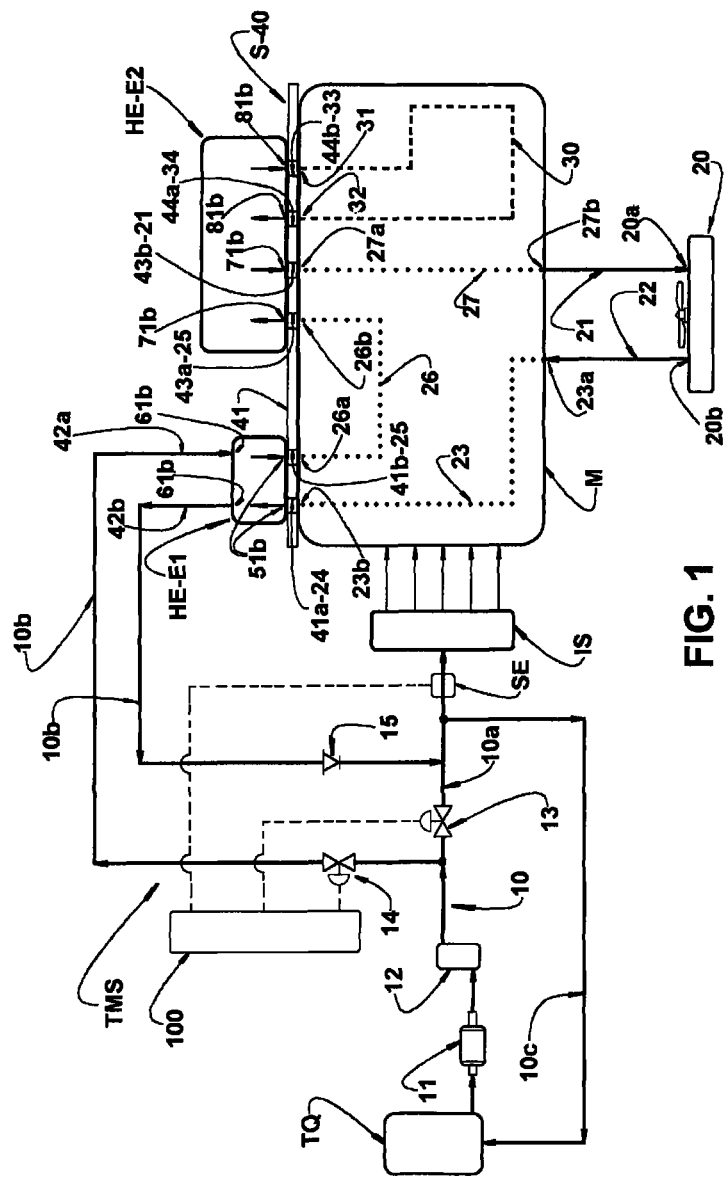
FIG. 1 represents a diagram of a thermal management system for the feeding of fuel to an internal combustion engine, said system being provided with the heat exchanger of the present invention, in a first assembly configuration.
Figure 2:
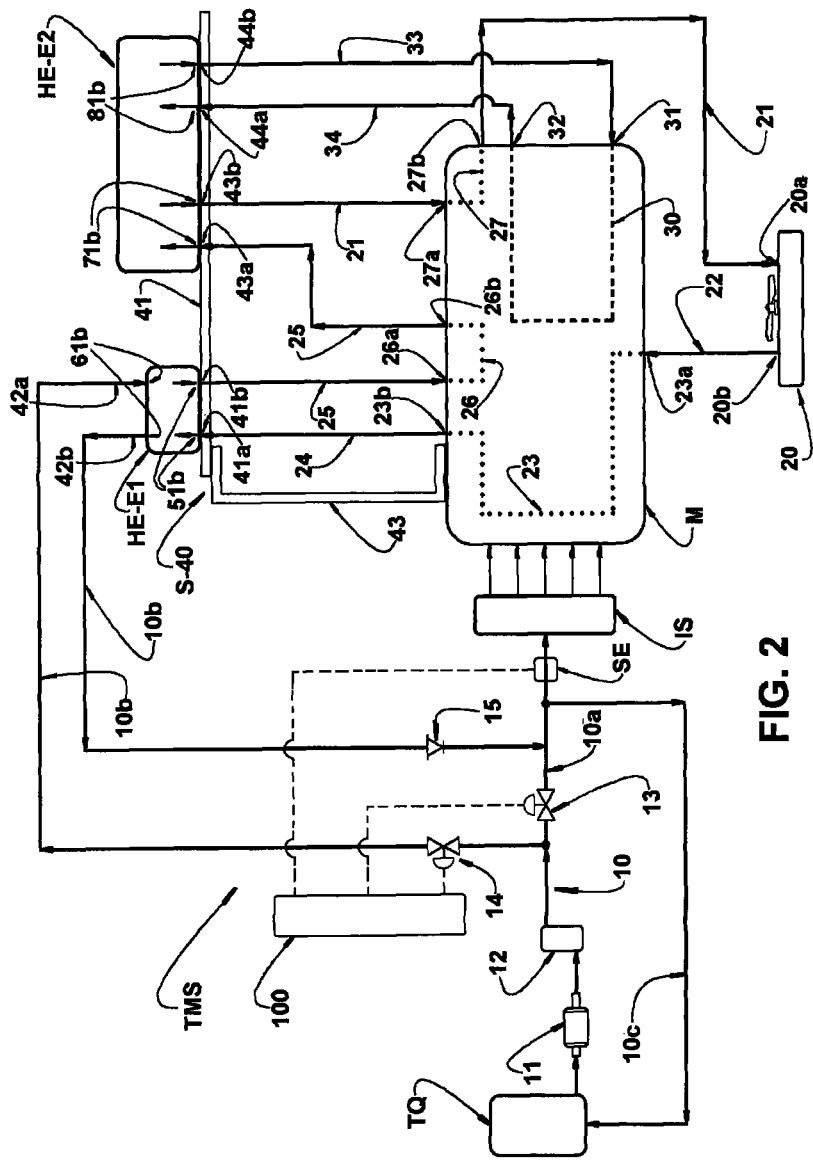
FIG. 2 represents a diagram of a thermal management system for the feeding of fuel to an internal combustion engine, said system being provided with the heat exchanger of the present invention, in a second assembly configuration.
Figure 3:
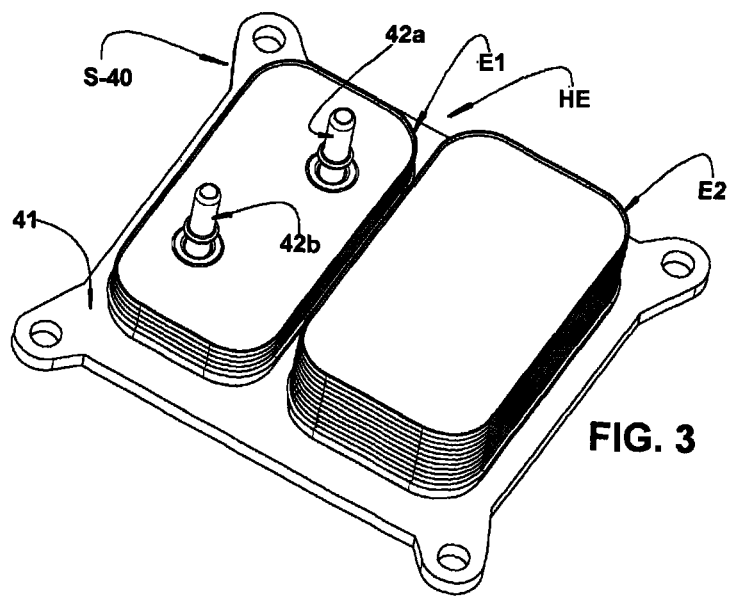
FIG. 3 represents a perspective view of a possible construction for the proposed heat exchanger, incorporating a flange for seating and securing both stages to the engine.
Figure 4:
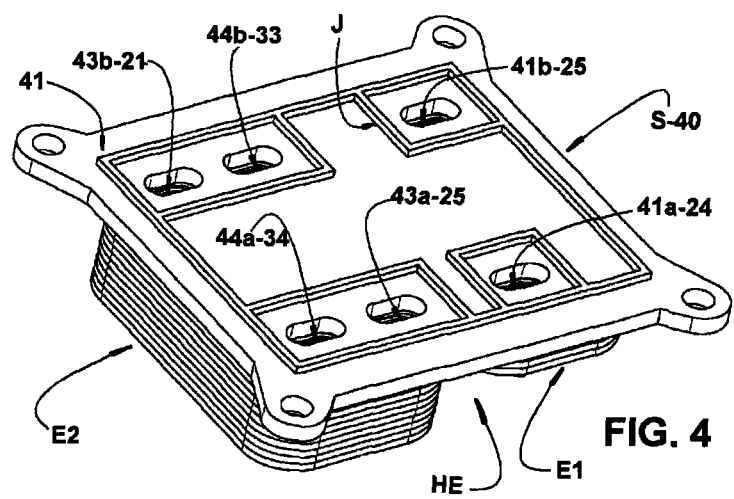
FIG. 4 represents a perspective view of the heat exchanger of FIG. 3, when seen from the side opposite to that in which is incorporated the mounting flange.
Figure 5:
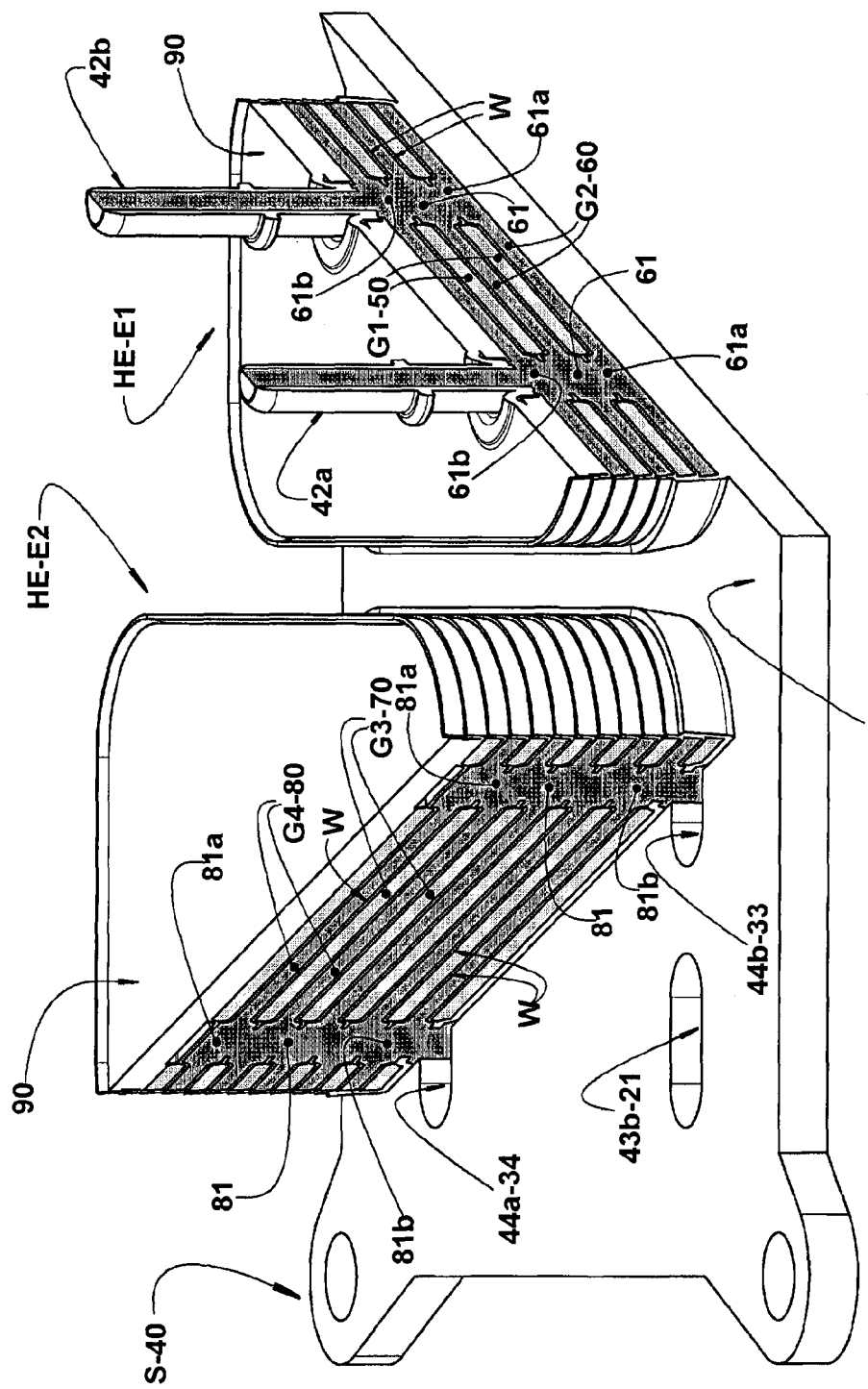
FIG. 5 represents the heat exchanger of FIGS. 3 and 4, which is cut according to two section planes, one of which being diametrical to the conduits of the fourth group of lubricant oil chambers in the second stage, and the other section plane being diametrical to the two conduits of the second group of fuel chambers in the first stage.
Figure 6:
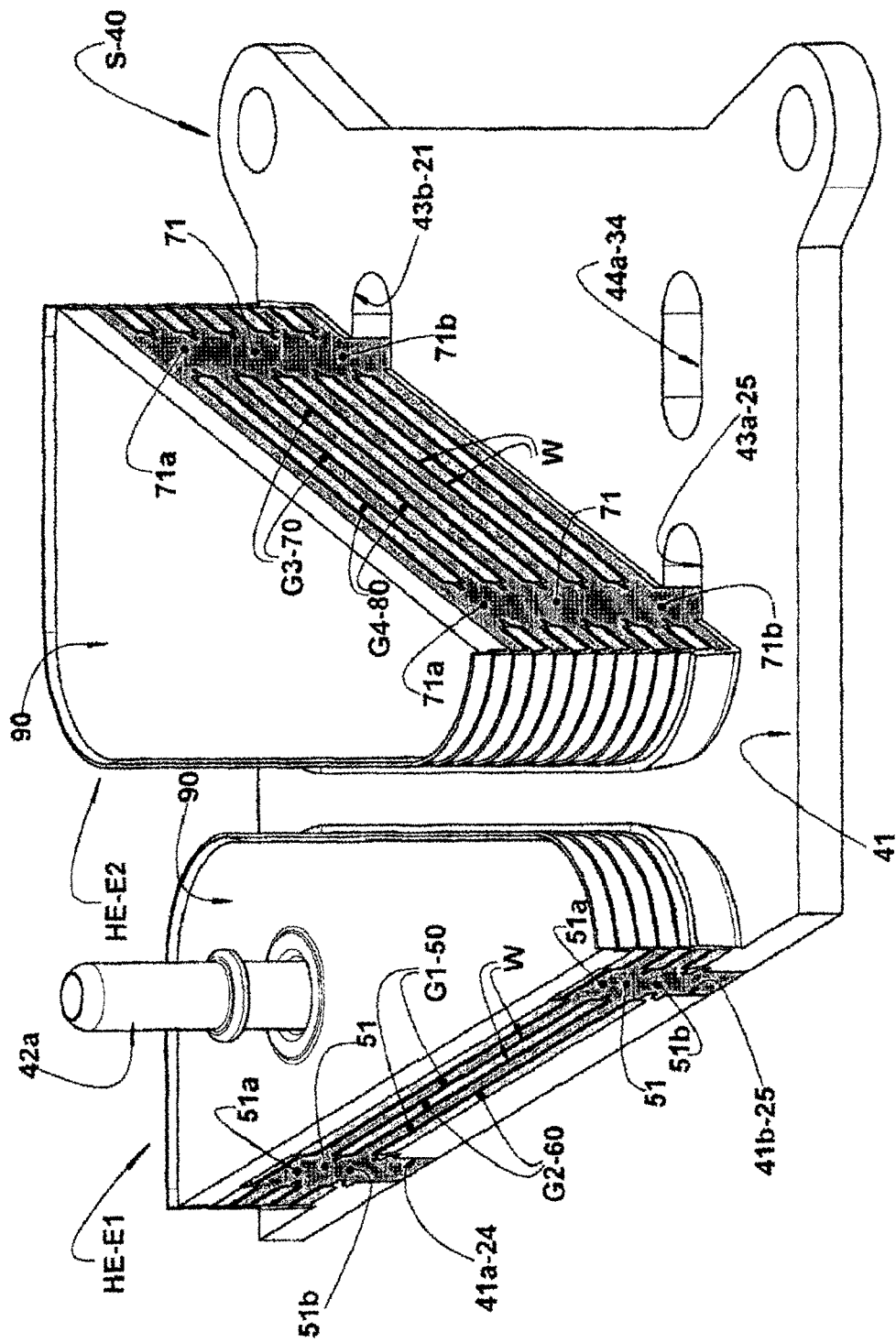
FIG. 6 represents the heat exchanger of FIGS. 3 and 4, which is cut according to two section planes, one of which being diametrical to the two conduits of the first group of chambers of cooling water in the first stage, and the other section plane being diametrical to the two conduits of the third group of chambers of cooling water in the second stage.

In FIGS. 1 and 2 of the attached drawings are illustrated two possible assembly embodiments of the heat exchanger HE, in a thermal management system TMS, operating in an engine M of internal combustion, provided with an injection system IS which is supplied from a fuel tank TQ, by means of a fuel feeding tube 10, provided with a fuel pump 11 and with a filter 12. The fuel feeding tube 10 comprises a first segment 10a connected to the injection system IS and provided with a first valve 13, and a second segment 10b which defines a by-pass to the first segment 10a, and in which is provided the heat exchanger HE.

In both illustrated assembly conditions, the engine M is operatively associated with a water radiator 20 which is connected, by means of a hot water conduit 21 and a cooled water conduit 22, to a cooling water circuit 23, internal to the engine M, to provide the usual cooling of the latter.

The cooling water circuit 23, internal to the engine M, has an inlet 23a and an outlet 23b, the inlet 23a being connected to the outlet 20b of the water radiator 20 by means of the cooled water conduit 22, external to the engine M.

The engine M further comprises therein a lubricant oil circulation circuit 30, presenting an inlet 31 and an outlet 32, open to the exterior of the engine M, in order to be connected to the heat exchanger HE, as described further below.

The heat exchanger HE comprises a first and a second stage E1,E2, of thermal exchange, each having an inlet and outlet of water 41*a*,41*b*;43*a*;43*b*, the second stage E2 having an inlet and an outlet of oil 44*a*,44*b*, the first stage E1 being provided with fuel inlet and outlet nozzles 42*a*,42*b*, selectively connected, in parallel, to the fuel supply to the engine M, more specifically to the fuel feeding tube 10.

As it may be observed from the drawings, the inlet and outlet of water 41*a*, 41*b* of the first stage E1 are respectively connected to the outlet 20*b* of the water radiator 20, by means of the cooling water circuit 23, and to the water inlet 43*a* of the second stage E2. The water outlet 43*b* of the second stage E2 is connected to the inlet 20*a* of the water radiator 20, and the inlet and outlet of oil 44*a*,44*b* in the second stage E2 are connected, in series, to the lubricant oil circuit 30. In the illustrated constructions, the water inlet 41*a* of the first stage E1 is connected to the outlet 20*b* of the water radiator 20 by means of the cooling water circuit 23, the latter having its inlet 23*a* connected to the outlet 20*b* of the water radiator 20 by means of a cooled water conduit 22, usually external to the engine M, and its outlet 23*b* connected to the water outlet 41*b* of the first stage E1.

Considering the fact that the stages are preferably seated and fixed to the engine M, the fuel inlet and outlet nozzles 42*a*, 42*b* are usually provided at one side of the first stage E1 which is opposite to one side of the latter in which are provided the inlet and outlet of water 41*a*, 41*b*.

However, it should be understood that the inlets and outlets of water and oil and also the fuel inlet and outlet nozzles in the heat exchanger HE may be arranged in different manners, according to the characteristics of each end use project.

In any of the arrangements illustrated in FIGS. 1 and 2, the water inlet 41*a* of the first stage E1 is connected to the outlet 23*b* of the cooling water circuit 23 by means of a return conduit 24, which may be defined in different manners, externally to the engine M or defined in the interior of a suitable protection element incorporated to the heat exchanger HE, more specifically to one or both of the stages E1, E2, as described further below.

The water outlet 41*b* of the first stage E1 is connected to the water inlet 43*a* of the second stage E2 by means of an interconnection conduit 25, which may also be defined in different manners, as described above for the return conduit 24. The water outlet 43*b* of the second stage E2 is connected to the inlet 20*a* of the water radiator 20, by means of a hot water conduit 21.

With the arrangement described above, the water cooled in the radiator 20 passes through the cooling water circuit 23 towards the interior of the first stage E1, exchanging heat with the fuel and then being taken to the second stage E2 through the interconnection conduit 25. In the second stage E2 the water exchanges heat with the lubricant oil and returns to the radiator 20 through the hot water conduit 21.

In the constructions schematically illustrated in FIGS. 1 and 2, the interconnection conduit 25 and the hot water conduit 21 each comprise a median segment 26, 27 provided in the interior of the engine M, each median segment 26, 27 defining at least part of the extension of the respective conduit and presenting an inlet 26*a*, 27*a* and an outlet 26*b*, 27*b* open to the outside of the engine M.

In turn, the inlet and outlet of oil of the second stage E2 are connected to the lubricant oil circulation circuit 30 by means of respective oil conduits 33, 34 which may be built in different manners, depending on how the two stages E1, E2 of the thermal exchange are associated with the engine M.

As schematically illustrated in FIG. 1, the water outlet 41*b* of the first stage E1 is seated against the engine M and maintained in fluid communication with the inlet 26*a* and with the outlet 26*b* of the median segment 26 of the interconnection conduit 25, the water outlet 43*b* of the second stages E2 being seated the engine M and maintained in fluid communication with the inlet 27*a* of the median segment 27 of the hot water conduit 21. In turn, the inlet and outlet of oil 44*a*, 44*b* of the second stage E2 are seated against the engine M and maintained in fluid communication with the lubricant oil circuit 30 by means of the oil conduits 33, 34 which then have their extension reduced, as commented further below.

Each of the two stages E1, E2, is preferably mounted to a support S, either individual or common, and configured to allow the fixation of the stages to the engine M or to any structure in the region of installation to the engine M.

The support S may be removably mounted to the engine M or to any other structure for installation to the engine M, by any adequate means such as, for example, by non-illustrated screws.

In the preferred form, the support S is defined by a flange 40, against one side of which is seated and affixed one or both stages E1, E2, said fixation being carried out by any suitable process compatible with the construction material of the stages and of the flange 40.

In the illustrated construction, the flange 40 presents through holes in which are respectively defined the inlet and outlet of water 41*a*, 41*b* of the first stage (E1) and the inlet and outlet of water 43*a*, 43*b* and the inlet and outlet of oil 44*a*,44*b* in the second stage E2. Considering the construction of the flange 40 mentioned above and illustrated in FIG. 1 and in FIGS. 3 to 6 of the attached drawings, the return conduit 24, the extensions of interconnection conduit 25 external to the engine (M), the hot water conduit 21 extension external to and located upstream the engine M, and the oil conduits 33, 34 are each defined by a respective through hole of the flange 40, each of said holes defining one of the inlets and outlets of water and oil 41*a*,41*b*,43*a*,43*b*,44*a*,44*b* in the first and in the second stage E1, E2.

The flange 40 is built to be seated and fixed against the engine M, in order to establish a direct fluid communication:
  of the water inlet 41*a* in the first stage E1 with the outlet 23*b* of the cooling water circuit 23;
  of the water outlet 41*b* of the first stage E1 with the inlet 26*a* of the median segment 26 of the interconnection conduit 25;
  of the outlet 26*b* of the median segment 26 of the interconnection conduit 25 with the water inlet 43*a* in the second stage E2;
  of the water outlet 43*b* of the second stage E2 with the inlet 27*a* of the median segment 27 of the hot water conduit 21; and
  of the inlet and outlet of oil 44*a*, 44*b* of the second stage E2 with the lubricant oil circuit 30.

In this type of assembly the heat exchanger HE may be directly and rigidly affixed to the engine M, making unnecessary to provide external conduits to the engine M in order to establish the fluid communications between the component parts defined by the stages E1, E2 of thermal exchange and also by the de cooling water circuit 23 and lubricant oil circuit 30.

In a possible construction of heat exchanger HE, the first stage E1 comprises a first and a second group G1,G2 of chambers 50,60, and the second stage comprises a third and a fourth group G3,G4 of chambers 70,80.

The chambers 50,60;70,80 of the two groups in each stage E1,E2 are alternately overlapped and open to two conduits 51,61;71,81 spaced from each other, every two conduits of the same group of chambers having inner ends 51a;61a;71a; 81a, open to an end chamber of the respective group, and outer ends 51b,61b,71b,81b respectively open to the inlet and outlet of water 41a,41b and to the fuel inlet and outlet nozzles 42a,42b in the first stage E1 and also to the inlet and outlet of water 43a,43b and to the inlet and outlet of oil 44a,44b in the second stage E2.

Thus, in the first stage E1 the chambers 50, 60 are alternated, allowing the thermal exchange to occur between the fuel and the water, the same occurring in relation to the chambers 70, 80 which form the second stage E2, in which occurs the thermal exchange between the water and the oil.

In the illustrated construction, the conduits 51, 61, 71, 81 of each group of chambers 50, 60, 70, 80 are located through the interior of the respective stage E1, E2 of thermal exchange, crossing the chambers located between the end chamber of the respective group G1, G2, G3, G4, to the interior of which are open the inner ends 51a, 61a, 71a, 81a of the respective conduits and the outer ends 51b,61b,71b, 81b of said conduits, the latter being medianly and radially open to the chambers of the respective group crossed by said conduit.

The outer ends 61b of the conduits 61 of the second group G2 of chambers 60 are respectively connected to the fuel inlet and outlet nozzles 42a, 42b, which project outward from an end cover 90, closing an adjacent chamber 60 of the second group G2 of chambers, located in an end of the first stage E1 which is opposite to another side of the latter in which are provided the inlet and outlet of water 41a, 41b.

In order to facilitate the thermal exchange between every two groups of chamber in the first and in the second stage E1, E2, the chambers of the two pairs of groups G1, G2; G3, G4, in the respective stages E1, E2, are separated from each other by a common wall W.

The chambers 50, 60, 70 of each stage E1,E2 may have the same flat and elongated shape and reduced height in relation to its area format, each of the two conduits 51,61, 71,81 of each group of chambers 50,60,70 being located in an end region of the respective stage E1,E2 of thermal exchange which is opposite to that in which is located the other conduit.

With the construction defined above, each fluid enters in the respective group of chambers by one of the conduits, being supplied to the regions of the group of chambers adjacent to said conduit, in order to be carried towards the other region of the same group of chambers, and to leave the latter by the other conduit, exchanging heat with the fluid which circulates through the other group of chambers of the same stage E1, E2.

The chambers 50, 60, 70, 80 may be built of any suitable material having high thermal conductivity and taking the form of trays, for example, with a bottom wall having a substantially rectangular and elongated shape, and incorporating a peripheral wall of low height whose free end is hermetically seated and affixed under the peripheral region of the bottom wall of an adjacent tray of the same stage E1, E2, the last tray of each stage being superiorly closed by an end cover 90 hermetically seated and affixed onto the free end of said last tray.

Although not illustrated in the drawings, it should be understood that the first and the second stages E1, E2, may be assembled in places distant from each other and somewhat spaced from the engine M, in which situation the return conduit 24, the interconnection conduit 25, the hot water conduit 21 and even the extensions of oil conduit 33, 34, may be defined as being totally external to the engine M, in the form of hoses or flexible conduits. In such case, the median segments 26, 27 of the interconnection conduit 25 and of the hot water conduit 21 would not exist.

In the assembly configuration illustrated in FIG. 1, the outer ends 51b, 71b of the conduits 51, 71 of the first and of the third group G1, G3 of chambers 50, 70, of the first and of the second stage E1, E2, are seated against the engine M and each maintained in fluid communication with the outlet 23b of the cooling water circuit 23, with the inlet 26a and with the outlet 26b of the median segment 26 of the interconnection conduit 25 and with the inlet 27a of the median segment 27 of the hot water conduit 21, respectively.

In a similar manner, the outer ends 81b of the conduits 81 of the fourth group G4 of chambers 80 are directly seated against the engine M and are respectively maintained in fluid communication with an inlet 31 and an outlet 32 of the lubricant oil circuit 30, in order to allow the lubricant oil do engine M to circulate through the interior of the chambers 80 of the fourth group G4.

The outer ends 61b of the conduits 61 of the second group G2 of chambers 60 are selectively connected, by the thermal management system TMS, to the fuel feeding tube 10, in order to define, together with the first group G1 of chambers 50 of the first stage E1, a by-pass to the fuel feeding tube 10.

In order to guarantee the tightness of the connection between the through holes of the flange 40 and the outlets 23b, 26b e 32 and inlets 26a, 27a e 31, respectively of return water, of hot water and of cooled oil in the engine M, the face for seating the flange 40 is provided with a sealing gasket J surrounding said through holes which respectively define the inlet and outlet of water 41a, 41b in the first stage E1, the inlet and outlet of water 43a, 43b and the inlet and outlet of oil 44a, 44b, in the second stage E2.

In the mounting arrangement illustrated in FIG. 2, the heat exchanger HE may have its two stages E1, E2 of thermal exchange affixed to the engine M or to any other structural element of the vehicle or of the installation of the engine M, by means of a single support S, common to both stages E1, E21 as illustrated, or in an individual support (not illustrated) for each stage. The support S may comprise a flange 41 incorporated to a spacing rod 43, to be affixed to the engine M or to any other structure, by any adequate means, maintaining the first and the second stages E1, E2 of thermal exchange somewhat spaced from the engine M.

Considering that the temperature of the lubricant oil inside the engine M is higher than the temperature of the cooling water and that this is higher than the temperature to which the fuel should be heated, the fuel chambers 60 of the second group G2 of the first stage E1 present common walls W only with the chambers 50 of the cooling water of the first group G1, still in the first first stage E1. In the second stage E2, the chambers 70 of the third group G3, containing cooling water coming from the first stage E1, present common walls W only with the chambers 80 of the fourth group G4 containing lubricant oil.

Thus, the cooled water coming from the radiator 20 passes through the engine M, cooling the latter and then being carried to the chambers 50 of the first group G1 in the first stage E1, where it exchanges heat with the fuel that passes through the chambers 60 of the second group G2, heating the fuel and being somewhat cooled and then carried to the chambers 70 of the third group G3 in the second stage E2, where it exchanges heat with the lubricant oil which circulates through the chambers 80 of the fourth group G4 of chambers.

As illustrated in FIGS. 1 and 2, the second segment 10b of the fuel feeding tube 10 is coupled to the fuel inlet and outlet nozzles 42a, 42b of the second group G2 of chambers 60 in the first stage E1 of the heat exchanger HE and provided with a second valve 14 located upstream the heat exchanger HE and with a one-way valve 15 located downstream said heat exchanger HE. The first valve 13 and the second valve 14 may be of the electromagnetic type, commanded by an electronic control unit 100, which receives different operational parameters from the engine M and also physicochemical parameters from the fuel (such as: temperature of the fuel being supplied; characteristics of the fuel or of the mixtures of different fuels; fuel injection pressure; pressure loss; etc.), in order to determine the maximum temperature value to be used for commanding the operation of the first and of the second valves 13, 14. It is usually also provided a return tube 10c, connecting the fuel tank TQ to a point of the fuel feeding tube 10 located downstream the second segment 10b, in order to allow the return, to the fuel tank TQ, of the fuel pumped to the injection system IS but not consumed by the engine M. However, it should be understood that the return tube 10c may be connected to the fuel feeding tube 10 at a point upstream the second segment 10b.

The thermal management system TMS, associated with the present heat exchanger HE, may comprise electromagnetic valves, individually assembled or in valve manifolds, driven from the electronic control unit 100, operatively associated with multiple sensors SE connected to the fuel supply system and to the engine M, in order to allow that the total or partial opening of the valve or valves occur as a function of the real requirements of heating the fuel to a temperature lower than that of vaporization of the fuel, either single or in a mixture.

The invention claimed is:

1. A heat exchanger for the feeding of fuel in internal combustion engines provided with a cooling water circuit, having an inlet, connected to an outlet of a water radiator, and an outlet; and with a lubricant oil circuit having an inlet and an outlet, wherein the heat exchanger (HE) comprises: a first and a second stage (E1, E2), each having an inlet and an outlet of water, the second stage (E2) having an inlet and an outlet of oil, the first stage (E1) being provided with fuel inlet and outlet nozzles, selectively connected, in parallel, to the fuel supply to the engine (M); the inlet and outlet of water of the first stage (E1) being respectively connected to the outlet of the water radiator, by means of the cooling water circuit, and to the water inlet of the second stage (E2);the water outlet of the second stage (E2) being connected to the inlet of the water radiator, and the inlet and outlet of oil in the second stage (E2) being connected in series to the lubricant oil circuit; each of the two stages (E1, E2) being mounted to a support (S), for fixation to the engine (M) or to a structure for installation to the engine (M) and being defined by a flange against one side of which is seated and affixed a respective stage (E1, E2), said flange presenting through holes respectively defined by the inlet and outlet of water of the first stage (E1) and the inlet and outlet of water and the inlet and outlet of oil in the second stage (E2); and the water inlet of the first stage (E1) being connected to the outlet of the water radiator by means of the cooling water circuit, an inlet of the cooling water circuit being connected to the outlet of the water radiator, by means of a cooled water conduit, and an outlet of the cooling water circuit being connected to the water outlet of the first stage (E1).

2. The heat exchanger, as set forth in claim 1, wherein the fuel inlet and outlet nozzles are provided at one side of the first stage (E1) which is opposite to a side of the latter in which are provided the inlet and outlet of water.

3. The heat exchanger, as set forth in claim 1, wherein the water inlet of the first stage (E1) is connected to the outlet of the cooling water circuit by a return conduit, the water outlet of the first stage (E1) being connected to the water inlet of the second stage (E2) by an interconnection conduit, the water outlet of the second stage (E2) being connected to the inlet of the water radiator, by a hot water conduit.

4. The heat exchanger, as set forth in claim 3, wherein the interconnection conduit and the hot water conduit each comprise a median segment provided inside the engine (M), each median segment being defined by at least part of the extension of the respective conduit and presenting an inlet and an outlet open to the outside of the engine (M).

5. The heat exchanger, as set forth in claim 4, wherein the inlet and outlet of oil of the second stage (E2) is connected to the lubricant oil circulation circuit by means of respective oil conduits.

6. The heat exchanger, as set forth in claim 5, wherein the water outlet of the first stage (E1) is seated against the engine (M) and maintained in fluid communication with the inlet and with the outlet of the median segment of the interconnection conduit, the water outlet of the second stages (E2) being seated against the engine (M) and maintained in fluid communication with the inlet of the median segment of the hot water conduit, the inlet and outlet of oil of the second stage (E2) being seated against the engine (M) and maintained in fluid communication with the lubricant oil circuit by means of the oil conduits.

7. The heat exchanger, as set forth in claim 6, wherein the return conduit, the interconnection conduit extensions external to the engine (M), the hot water conduit extension which is external and located upstream the engine (M) and the oil conduits are each defined by a respective through hole of the flange, which define the inlets and outlets of water and oil in the first and in the second stage (E1, E2).

8. The heat exchanger, as set forth in claim 7, wherein the flange is seated and affixed against the engine (M), in order to establish the direct fluid communication between: the water inlet in the first stage (E1) with the outlet of the cooling water circuit; the water outlet of the first stage (E1) with the inlet of the median segment of the interconnection conduit; the outlet of the median segment of the interconnection conduit with the water inlet in the second stage (E2); the water outlet of the second stage (E2) with the inlet of the median segment of the hot water conduit; and of the inlet and outlet of oil of the second stage (E2) with the lubricant oil circuit.

9. The heat exchanger, as set forth in claim 1, wherein the first stage (E1) comprises a first and a second group (G1,G2) of chambers, the second stage comprising a third and fourth groups (G3,G4) of chambers, the chambers of both groups in each stage (E1,E2) being alternately overlapped and open to two conduits spaced from each other, every two conduits of the same group of chambers having inner ends, open to an end chamber of the respective group, and outer ends respectively open to the inlet and outlet of water and to the fuel inlet and outlet nozzles in the first stage (E1) and also to the inlet and outlet of water and to the inlet and outlet of oil in the second stage (E2).

10. The heat exchanger, as set forth in claim 9, wherein the conduits of each group of chambers are located through the interior of the respective stage (E1, E2), crossing the chambers located between the outer chamber of the respective group (G1, G2, G3, G4), to the interior of which are open the inner ends of the respective conduits, and the outer ends of said conduits, the latter being centrally and radially open to the chambers of the respective group crossed by said conduit.

11. The heat exchanger, as set forth in claim 9, wherein the other outer ends of the conduits of the second group (G2) of chambers are respectively connected to the fuel inlet and outlet nozzles which project outward from an end cover, closing an adjacent chamber of the second group (G2) of chambers, located in an end of the first stage (E1) opposite to the other side of the latter in which are provided the inlet and outlet of water.

12. The heat exchanger, as set forth in claim 9, wherein the chambers of both pairs of groups (G1, G2; G3, G4) in the respective stages (E1, E2) are separated from each other by a common wall (W).

13. The heat exchanger, as set forth in claim 9, wherein the chambers of each stage (E1,E2) have the same flat elongated shape and reduced height in relation to its area, each of the two conduits of each group of chambers being located in an end region of the respective stage (E1,E2) of thermal exchange which is opposite to that in which is located the other conduit.

14. A heat exchanger for the feeding of fuel in internal combustion engines provided with a cooling water circuit, having an inlet, connected to an outlet of a water radiator, and an outlet; and with a lubricant oil circuit having an inlet and an outlet, wherein the heat exchanger (HE) comprises: a first and a second stage (E1, E2), each having an inlet and an outlet of water, the second stage (E2) having an inlet and an outlet of oil, the first stage (E1) being provided with fuel inlet and outlet nozzles, selectively connected, in parallel, to the fuel supply to the engine (M); the inlet and outlet of water of the first stage (E1) being respectively connected to the outlet of the water radiator, by means of the cooling water circuit, and to the water inlet of the second stage (E2); the water outlet of the second stage (E2) being connected to the inlet of the water radiator, and the inlet and outlet of oil in the second stage (E2) being connected in series to the lubricant oil circuit; each of the two stages (E1, E2) being mounted to a support (S), for fixation to the engine (M) or to a structure for installation to the engine (M) and being defined by a flange against one side of which is seated and affixed a respective stage (E1, E2), said flange presenting through holes respectively defined by the inlet and outlet of water of the first stage (E1) and the inlet and outlet of water and the inlet and outlet of oil in the second stage (E2); and the fuel inlet and outlet nozzles being provided at one side of the first stage (E1), the one side being opposite to a side of the first stage (E1) in which are provided the inlet and outlet of water.

15. The heat exchanger, as set forth in claim 14, wherein: the water inlet of the first stage (E1) is connected to the outlet of the cooling water circuit by a return conduit, the water outlet of the first stage (E1) being connected to the water inlet of the second stage (E2) by an interconnection conduit, the water outlet of the second stage (E2) being connected to the inlet of the water radiator, by a hot water conduit; the interconnection conduit and the hot water conduit each comprise a median segment provided inside the engine (M), each median segment being defined by at least part of the extension of the respective conduit and presenting an inlet and an outlet open to the outside of the engine (M); the inlet and outlet of oil of the second stage (E2) is connected to the lubricant oil circulation circuit by means of respective oil conduits; and the water outlet of the first stage (E1) is seated against the engine (M) and maintained in fluid communication with the inlet and with the outlet of the median segment of the interconnection conduit, the water outlet of the second stages (E2) being seated against the engine (M) and maintained in fluid communication with the inlet of the median segment of the hot water conduit, the inlet and outlet of oil of the second stage (E2) being seated against the engine (M) and maintained in fluid communication with the lubricant oil circuit by means of the oil conduits.

16. The heat exchanger, as set forth in claim 14, wherein: the return conduit, the interconnection conduit extensions external to the engine (M), the hot water conduit extension which is external and located upstream the engine (M) and the oil conduits are each defined by a respective through hole of the flange, which define the inlets and outlets of water and oil in the first and in the second stage (E1, E2); and the flange is seated and affixed against the engine (M), in order to establish the direct fluid communication between: the water inlet in the first stage (E1) with the outlet of the cooling water circuit; the water outlet of the first stage (E1) with the inlet of the median segment of the interconnection conduit; the outlet of the median segment of the interconnection conduit with the water inlet in the second stage (E2); the water outlet of the second stage (E2) with the inlet of the median segment of the hot water conduit; and of the inlet and outlet of oil of the second stage (E2) with the lubricant oil circuit.

17. The heat exchanger, as set forth in claim 14, wherein: the first stage (E1) comprises a first and a second group (G1,G2) of chambers, the second stage comprising a third and fourth groups (G3,G4) of chambers, the chambers of both groups in each stage (E1,E2) being alternately overlapped and open to two conduits spaced from each other, every two conduits of the same group of chambers having inner ends, open to an end chamber of the respective group, and outer ends respectively open to the inlet and outlet of water and to the fuel inlet and outlet nozzles in the first stage (E1) and also to the inlet and outlet of water and to the inlet and outlet of oil in the second stage (E2); and one of: the conduits of each group of chambers are located through the interior of the respective stage (E1, E2), crossing the chambers located between the outer chamber of the respective group (G1, G2, G3, G4), to the interior of which are open the inner ends of the respective conduits, and the outer ends of said conduits, the latter being centrally and radially open to the chambers of the respective group crossed by said conduit; or the other outer ends of the conduits of the second group (G2) of chambers are respectively connected to the fuel inlet and outlet nozzles which project outward from an end cover, closing an adjacent chamber of the second group (G2) of chambers, located in an end of the first stage (E1) opposite to the other side of the latter in which are provided the inlet and outlet of water; or the chambers of both pairs of groups (G1, G2; G3, G4) in the respective stages (E1, E2) are separated from each other by a common wall (W); or the chambers of each stage (E1,E2) have the same flat elongated shape and reduced height in relation to its area, each of the two conduits of each group of chambers being located in an end region of the respective stage (E1,E2) of thermal exchange which is opposite to that in which is located the other conduit.

18. A heat exchanger for the feeding of fuel in internal combustion engines provided with a cooling water circuit, having an inlet, connected to an outlet of a water radiator, and an outlet; and with a lubricant oil circuit having an inlet and an outlet, wherein the heat exchanger (HE) comprises:

a first and a second stage (E1, E2), each having an inlet and an outlet of water, the second stage (E2) having an inlet and an outlet of oil, the first stage (E1) being provided with fuel inlet and outlet nozzles, selectively connected, in parallel, to the fuel supply to the engine (M); the inlet and outlet of water of the first stage (E1) being respectively connected to the outlet of the water radiator, by means of the cooling water circuit, and to the water inlet of the second stage (E2); the water outlet of the second stage (E2) being connected to the inlet of the water radiator, and the inlet and outlet of oil in the second stage (E2) being connected in series to the lubricant oil circuit; each of the two stages (E1, E2) being mounted to a support (S), for fixation to the engine (M) or to a structure for installation to the engine (M) and being defined by a flange against one side of which is seated and affixed a respective stage (E1, E2), said flange presenting through holes respectively defined by the inlet and outlet of water of the first stage (E1) and the inlet and outlet of water and the inlet and outlet of oil in the second stage (E2); and the first stage (E1) comprises a first and a second group (G1,G2) of chambers, the second stage comprising a third and fourth groups (G3,G4) of chambers, the chambers of both groups in each stage (E1 ,E2) being alternately overlapped and open to two conduits spaced from each other, every two conduits of the same group of chambers having inner ends, open to an end chamber of the respective group, and outer ends respectively open to the inlet and outlet of water and to the fuel inlet and outlet nozzles in the first stage (E1) and also to the inlet and outlet of water and to the inlet and outlet of oil in the second stage (E2).

19. The heat exchanger, as set forth in claim 18, wherein: the conduits of each group of chambers are located through the interior of the respective stage (E1, E2), crossing the chambers located between the outer chamber of the respective group (G1, G2, G3, G4), to the interior of which are open the inner ends of the respective conduits, and the outer ends of said conduits, the latter being centrally and radially open to the chambers of the respective group crossed by said conduit; or the other outer ends of the conduits of the second group (G2) of chambers are respectively connected to the fuel inlet and outlet nozzles which project outward from an end cover, closing an adjacent chamber of the second group (G2) of chambers, located in an end of the first stage (E1) opposite to the other side of the latter in which are provided the inlet and outlet of water; or the chambers of both pairs of groups (G1, G2; G3, G4) in the respective stages (E1, E2) are separated from each other by a common wall (W); or the chambers of each stage (E1,E2) have the same flat elongated shape and reduced height in relation to its area, each of the two conduits of each group of chambers being located in an end region of the respective stage (E1,E2) of thermal exchange which is opposite to that in which is located the other conduit.

20. The heat exchanger, as set forth in claim 18, wherein: the water inlet of the first stage (E1) is connected to the outlet of the cooling water circuit by a return conduit, the water outlet of the first stage (E1) being connected to the water inlet of the second stage (E2) by an interconnection conduit, the water outlet of the second stage (E2) being connected to the inlet of the water radiator, by a hot water conduit; the interconnection conduit and the hot water conduit each comprise a median segment provided inside the engine (M), each median segment being defined by at least part of the extension of the respective conduit and presenting an inlet and an outlet open to the outside of the engine (M); the inlet and outlet of oil of the second stage (E2) is connected to the lubricant oil circulation circuit by means of respective oil conduits; and the water outlet of the first stage (E1) is seated against the engine (M) and maintained in fluid communication with the inlet and with the outlet of the median segment of the interconnection conduit, the water outlet of the second stages (E2) being seated against the engine (M) and maintained in fluid communication with the inlet of the median segment of the hot water conduit, the inlet and outlet of oil of the second stage (E2) being seated against the engine (M) and maintained in fluid communication with the lubricant oil circuit by means of the oil conduits.

\* \* \* \* \*